April 7, 1925.
W. WISHART ET AL
1,532,214
FREEZING THERMOSTAT AND CONTROL MECHANISM
Filed Aug 8, 1921    2 Sheets-Sheet 1
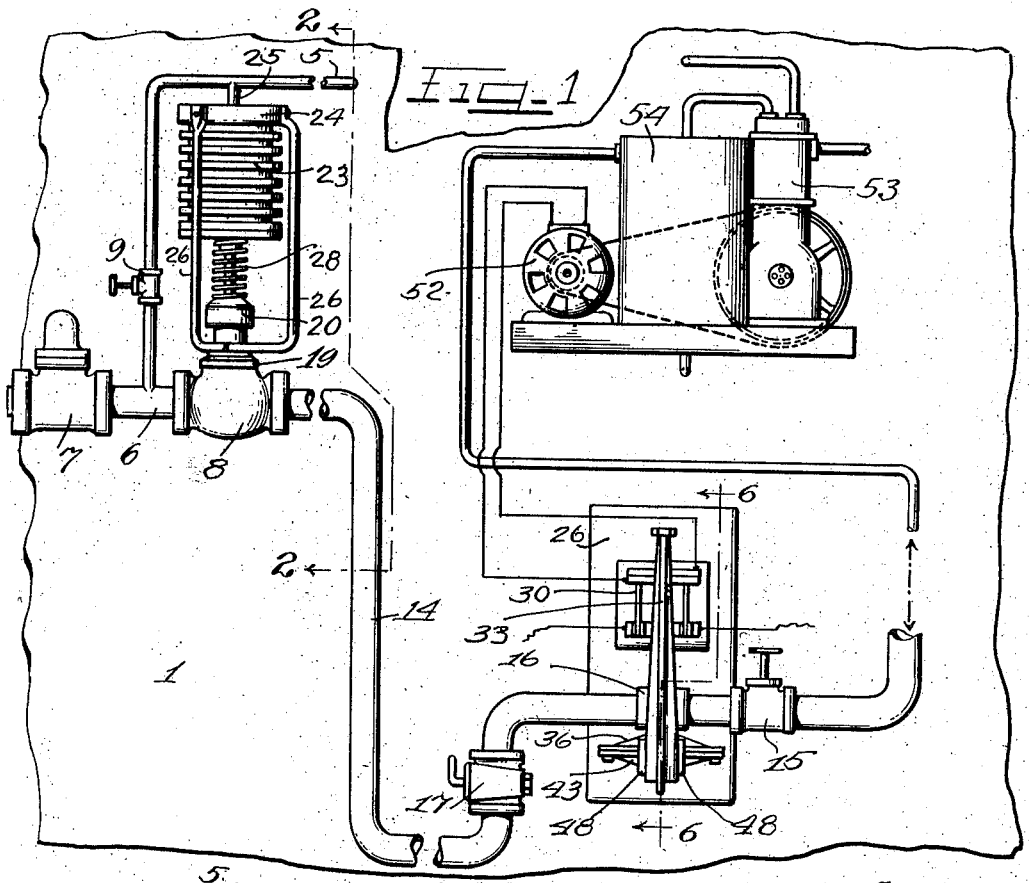
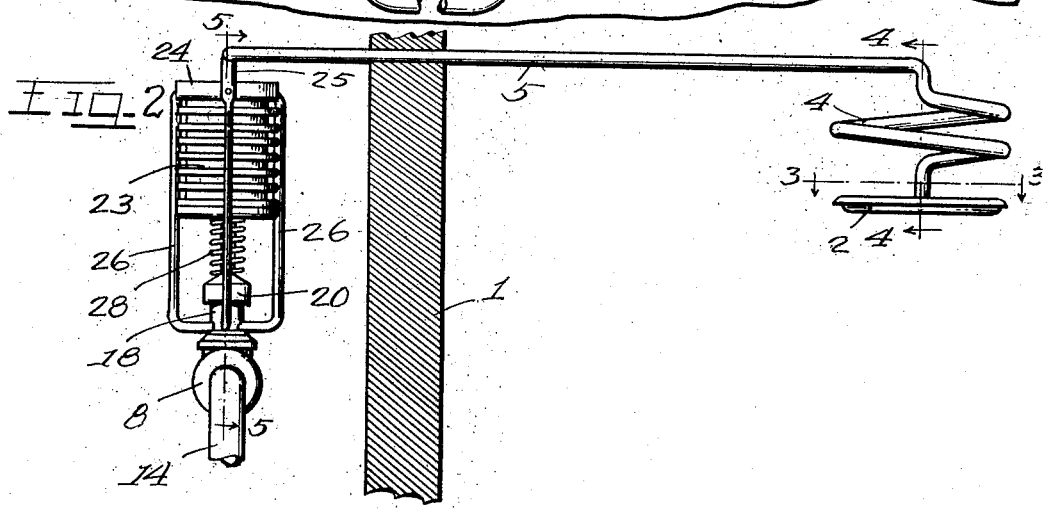
Witnesses
A. L. Mills
S B Emerson
Inventor
William Wishart
Albert H. Morrell
by Charles W. Hills Atty.

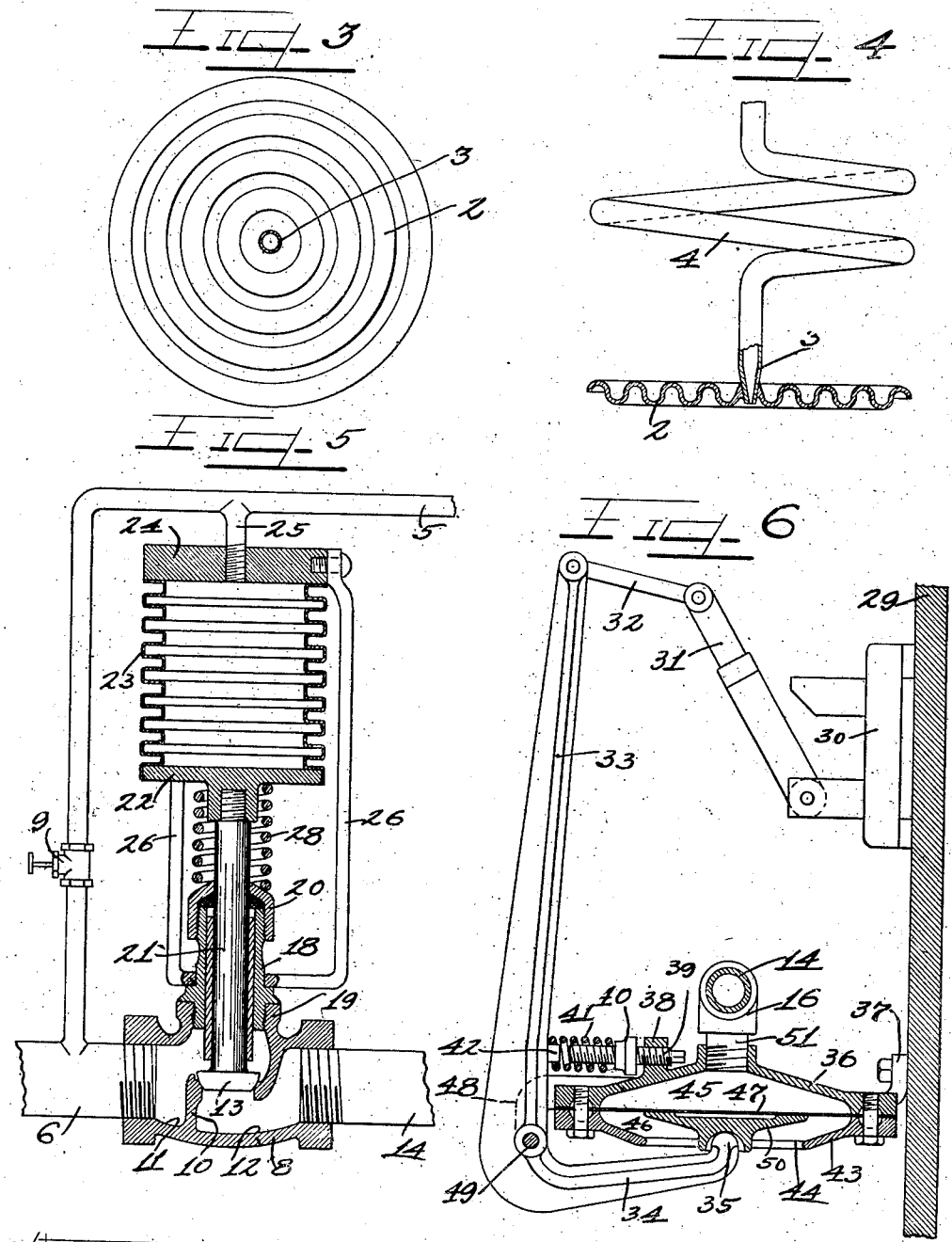

Patented Apr. 7, 1925.

1,532,214

UNITED STATES PATENT OFFICE.

WILLIAM WISHART AND ALBERT H. MORRELL, OF CLINTON, IOWA, ASSIGNORS, BY MESNE ASSIGNMENTS, TO CLIMAX ENGINEERING COMPANY, OF CLINTON, IOWA, A CORPORATION OF DELAWARE.

FREEZING THERMOSTAT AND CONTROL MECHANISM.

Application filed August 8, 1921. Serial No. 490,779.

*To all whom it may concern:*

Be it known that we, WILLIAM WISHART and ALBERT H. MORRELL, citizens of the United States, and residents of the city of Clinton, in the county of Clinton and State of Iowa, have invented certain new and useful Improvements in a Freezing Thermostat and Control Mechanism; and we do hereby declare that the following is a full, clear, and exact description of the same, reference being had to the accompanying drawings, and to the numerals of reference marked thereon, which form a part of this specification.

This invention relates more particularly to an improved type of a thermostatically controlled mechanism adapted to be automatically controlled by a freezing thermostat to regulate the supply of cold water from a main water supply line to the condenser coils of a refrigerating plant and to cause operation of a motor control switch which governs the operation of the compressor of the refrigerating plant when necessary.

It is an object of this invention to provide a freezing thermostat adapted to control the operation of a valve mechanism which governs the flow of cooling water to a condenser and the operation of a switch controlling a compressor.

Another object of the invention is to provide a freezing thermostat control device to automatically control the operation of the condenser and the compressor of a refrigerating plant.

It is a further object of this invention to provide an automatic control for the compressor and the condenser of a refrigerating plant by installing a freezing thermostat in a refrigerator whereby a spring and pressure controlled water valve is adapted to be operated to govern the supply of cooling water to the condenser and the operation of a motor control switch.

It is also an object of this invention to construct a device for controlling the operation of a refrigerating machine by freezing shut an opening in a thermostat positioned in the refrigerator.

It is an important object of this invention to provide a simple and improved refrigerator control mechanism the operation of which is governed by a valve device adapted to shut off the supply of water to the condenser when the temperature in the refrigerator is low enough to freeze the water issuing from a small opening provided in a thermostat positioned in the refrigerator.

Other and further important objects of this invention will be apparent from the disclosures in the specification and drawings.

The invention (in a preferred form) is illustrated in the drawings and hereinafter more fully described.

On the drawings:

Figure 1 is a developed view of the device connected with a refrigerator having parts broken away.

Figure 2 is a sectional view taken on line 2—2 of Figure 1.

Figure 3 is an enlarged sectional view of the thermostat member taken on the line 3—3 of Figure 2.

Figure 4 is an enlarged sectional view thereof taken on line 4—4 of Figure 2, showing the coil in elevation.

Figure 5 is an enlarged section taken on line 5—5 of Figure 2, showing parts in elevation.

Figure 6 is an enlarged sectional view of the switch mechanism taken on line 6—6 of Figure 1.

As shown on the drawings:

A refrigerator is indicated by the reference numeral 1 and disposed within said refrigerator is a grooved or corrugated thermostat plate 2 provided with a central opening. Projecting through the thermostat plate opening is the tapered nozzle 3 of a pipe coil 4 connected with a pipe 5. The pipe 5 projects out of the refrigerator and is connected to a water supply or feed pipe 6. A pressure regulating valve 7 may be used in the pipe 6 if necessary. A control or shut-off valve 9 is provided in the pipe 5. A valve casing 8 is provided having openings at both ends and at the top. A partition or wall 10 is formed in the valve casing 8 to divide the same into an intake chamber 11 and an outlet chamber 12. The partition 10 is formed to provide a valve seat adapted to receive a water control valve 13 seated thereagainst to shut off communication between the intake and outlet chambers of the valve casing. Threaded into the intake end of the valve casing 8 is one end of the main water supply or feed pipe 6. Threaded into the outlet end of the valve casing 8 is one end of a water pipe 14, the other end of which leads to a condenser 54 forming a part of the refrigerating plant. A regulating valve 15 is provided in the condenser supply pipe 14 on the condenser side of a T or three-way connector 16. Provided in the pipe 14 between the T 16 and the valve casing 8 is a manually operable shut-off valve 17.

Figures 1 and 5 illustrate a thermostatically governed valve control mechanism comprising a longitudinally passaged flanged guide sleeve 18, the lower end of which is externally threaded and securely engaged in an internally threaded rim or top arm 19 integrally formed on top of the valve casing 8. An apertured cap 20 having a packing therein is threaded onto the upper end of the guide sleeve 18. Secured to the top of the control valve 13 is the lower end of a valve stem 21, which slidably projects upwardly through the guide sleeve 18 and the cap 20 and has the upper end rigidly secured to a bottom plate 22 of a corrugated longitudinally adjustable flexible pressure cylinder 23. A top plate 24 closes the top of the pressure cylinder 23. Threaded into an opening in the top plate 24 is one end of a pipe 25, the other end of which is connected with the thermostat water supply pipe 5. The top plate 24 is held against upward movement or flexing by means of a plurality of upright brace arms 26, the ends of which are rigidly secured to the guide sleeve 18 and the top plate 24. Engaged around the upper projecting end of the valve stem 21 is a coiled spring 28, the lower end of which rests upon the top of the cap 20, while the upper end of said spring presses against the bottom plate 22 of the pressure cylinder to normally compress the cylinder 23 and thereby hold the valve 13 in an elevated open position to permit water from the pipe 6 to pass through the valve casing and into the pipe 14 to the condenser.

A control switch 30 is mounted on a board 29 and has certain of the terminals thereof connected with a power line and the remaining terminals connected by wires with the terminals of a driving motor 52 for the compressor 53 of the refrigerating plant. The mounting board 29 may be mounted on the refrigerating machine frame or in any other convenient place.

Pivotally connected to the outer end of the switch handle 31 is one end of a connecting rod 32, the other end of which is pivotally connected to the upper free end of a long arm 33 of a bell-crank. The short arm 34 of the bell-crank has the end thereof bent to form a finger 35.

Associated with the short arm 34 of the bell-crank is a diaphragm casing comprising a flanged conical upper section 36 having supporting lugs 37 integrally formed thereon and rigidly secured to the mounting board 29 by screw bolts or other suitable means. Integrally formed on the top of the upper casing section 36 is a vertical lug 38 provided with a threaded passage through which is threaded an adjusting screw 39 having a square head on the inner end thereof to facilitate turning of the screw. Adjustably threaded on the screw 39 is a nut 40, against which one end of a coiled spring 41 is engaged. The spring 41 is coiled around the screw 39 and has the other end thereof engaging a projection 42 formed on the lower portion of the long bell-crank arm 33 to normally hold said arm projected outwardly away from the mounting board 29. The screw 39 and the nut 40 may be adjusted to regulate the pressure exerted by the spring 41 on the bell-crank arm 33.

Removably secured to the flange of the upper diaphragm casing section 36 by screw bolts is the flange of a lower diaphragm casing section 43 which is provided with a central opening 44. A chamber 45 of the upper casing section 36 is separated from an open chamber 46 of the lower casing section 43 by means of a pressure actuated diaphragm 47. The diaphragm 47 is clamped between the flanges of the casing sections and is held in place by the screw bolts which connect the casing sections. Integrally formed on the upper casing section 36 are a pair of outwardly and downwardly projecting brackets 48 provided with a pivot pin 49 on which the bight portion of the bell crank 33—34 is pivotally mounted. The bell-crank controlling spring 41 acts to hold the rounded finger 35 of the short bell-crank arm 34 seated in a centrally recessed plate 50 to hold the same against the under surface of the diaphragm 47. The upper diaphragm casing section 36 is connected to the connector 16 by a short pipe 51.

The operation is as follows:

The freezing thermostat device of this invention is for use in connection with a refrigerating plant wherein an expansion coil in a refrigerator is supplied with a refrigerant by means of the refrigerating plant. The refrigerating plant is also provided with a condenser 54 for cooling the refrigerant. The condenser is connected to the water supply pipe 14. Two of the terminals of the switch 30 are connected by suitable wires to the motor 52 which operates the compressor 53 forming a part of the refrigerating plant. The remaining two switch terminals are connected with a source of electrical power.

The freezing thermostat 2—4 is positioned within the refrigerator 1, as illustrated in Figure 2. To start the operation of the refrigerating plant the valves 9, 15 and 17 are opened and regulated. Since nozzle 3 is open, there is no pressure in the pressure cylinder 23 and the coiled spring 28 acts against the bottom plate 22 to compress the flexible cylinder 23, thereby opening the control valve 13. Water from the main water supply pipe 6 is thus permitted to flow through the valve chambers 11 and 12, and then through the pipe 14 to the condenser. The valve 15 may be adjusted to regulate the flow of water to the condenser. Water from the pipe 14 passes downwardly through the middle arm of the three way connector 16 and through the connecting pipe 51 and enters the upper chamber 45 of the diaphragm casing 36—43. Pressure is thus exerted to deflect the diaphragm 47 downwardly thereby swinging the short bell-crank arm 34 downwardly and at the same time forcing the long bell-crank arm 33 inwardly against the action of the spring 41 to close the switch 30—31. With the switch closed the refrigerating plant motor 52 is set into operation to drive the compressor 53, whereby the refrigerating gas from the refrigerating expansion coil is compressed in the compressor and forced through the coils in condenser 54 to be condensed by the cold water from the main supply pipe 14 before being returned to the expansion coil.

Since the regulating valve 9 in the pipe 5 has been opened a small quantity of water from the pipe 6 flows through the auxiliary pipe 5 and the coil 4 and slowly drops through the restricted nozzle 3. When the temperature surrounding the thermostat 2 is reduced to freezing, the water dripping from the nozzle 3 is frozen thereby closing up the open end of said nozzle 3 and thereby allowing the pressure of the water in the pipe 5 to increase. The water from the pipe 5 also flows through the pipe 25 into the pressure cylinder 23 and since the inner end of the pipe 5 has been frozen up, the pressure in the cylinder 23 is gradually increased thereby forcing the bottom plate 22 downwardly against the action of the spring 28 to seat the valve 13 upon the valve seat as illustrated in Figure 5. The valve 13 is thus closed to shut off the flow of cold water from the pipe 6.

The corrugated plate 2 acts as a means for radiating heat to cause cooling of the nozzle 3 and may be located in any desired position in the refrigerator for the purpose of controlling the desired temperature. The temperature may also be controlled by adjusting the regulating valve 9.

With the valve 13 closed the pressure in the diaphragm chamber 45 is reduced and the spring 41 acts automatically to force the bell-crank arm 33 outwardly thereby opening the switch 30 to stop the operation of the motor 52 and the compressor 53.

Since the operation of the compressor 53 has been stopped the temperature in the refrigerator will gradually rise until it is sufficient to melt the ice closing the end of the nozzle 3. The water from the pipe 5 is therefore again permitted to drip through the nozzle 3, thereby relieving the pressure in the cylinder 23. With the reduction of pressure in the cylinder 23 the spring 28 acts automatically to compress the cylinder 23, thereby opening the valve 13 and again permitting the flow of water from the pipe 6 to the condenser coils. The pressure of the water in the diaphragm casing chamber 45 is again increased to deflect the diaphragm to operate the bell-crank and close the control switch 30 to start the operation of the motor 52 and the compressor 53. It will thus be noted that the freezing thermostat 2—4 in the refrigerator acts to automatically control the operation of the main control valve 13 which in turn governs the operation of the motor and the compressor.

The valve 17 is provided in the pipe 14 for the purpose of disclosing a means whereby the plant may be manually shut down if desired.

It will of course be understood that the flexible cylinder 23 may be replaced by diaphragm or piston mechanisms to operate a mechanism controlling the flow of cooling water to the condensers of the refrigerating plant.

We are aware that numerous details of construction may be varied through a wide range without departing from the principles of this invention, and we therefore do not purpose limiting the patent granted otherwise than necessitated by the prior art.

We claim as our invention:

1. The combination with a refrigerating plant, and a refrigerator, of a control switch for said plant, a water supply pipe for said plant, a valve in said pipe, a diaphragm mechanism connected between said pipe and switch, and means controlled by the temperature in the refrigerator and operated solely by the water supply for governing the operation of said valve and switch, whereby to govern the operation of the refrigerating plant.

2. The combination with a refrigerating plant, of a control switch therefor, a water supply pipe, a valve in said pipe, a diaphragm mechanism connected between said switch, and a freezing drip thermostat connected with the water supply and governing the operation of said valve and which in turn through said diaphragm governs said switch whereby to control the operation of the refrigerating plant.

3. The combination with a refrigerating plant, a water supply pipe therefor, and the refrigerator thereof, a water drip thermostat in said refrigerator connected with said pipe and adapted to be frozen shut and thawed open by the temperature in the refrigerator, said thermostat effecting automatic control of the operation of said refrigerating plant solely through the pressure in said water pipe.

4. A refrigerating plant, including a condenser and a compressor motor, a condenser water supply valve, and a motor control switch, of a diaphragm mechanism connected with said valve, a bell-crank connected with the switch and with said diaphragm mechanism adapted to be actuated by water pressure when the valve is open to operate the bell-crank to close the switch, a spring controlled expansion device connected with the valve for normally holding said valve in open position to permit the flow of water therethrough, a refrigerator, an apertured thermostat plate positioned in the refrigerator, a pipe and pipe coil connecting said valve and expansion device with the apertured thermostat plate, and a drip nozzle at one end of the pipe coil projecting through said thermostat plate, said nozzle adapted to be frozen shut when the temperature surrounding the thermostat plate is reduced to freezing thereby increasing the pressure in said expansion device to expand the same to close the water supply valve and open the motor control switch.

5. In a refrigerating plant the combination with the refrigerator thereof, of a freezing drip thermostat positioned in the refrigerator, a condenser water supply valve, a spring controlled expansion member connected with the valve to hold the same in open position, piping for supplying water to said expansion member and to said freezing thermostat, and a motor control switch mechanism adapted to be closed when said valve is open to cause operation of the refrigerating plant to reduce the temperature in said refrigerator, said freezing thermostat adapted to be frozen shut when the temperature in the refrigerator is sufficiently reduced whereby the pressure in said expansion member is increased to expand the same to close the valve and open the switch.

6. The combination with a refrigerating plant and the refrigerator thereof, of a condenser water supply pipe, a valve in said pipe, a diaphragm mechanism connected with said pipe, a motor control switch mechanism for said plant controlled by said diaphragm mechanism, and a freezing drip thermostat in said refrigerator connected with said water supply pipe and with said valve and controlling said valve and diaphragm, said freezing thermostat comprising a pipe coil connected with the water supply pipe and valve mechanism, a restricted nozzle formed on one end of said coil, and means secured on said nozzle for absorbing or radiating heat at said nozzle.

7. The combination with a refrigerating plant, and a water supply therefor, of a pressure actuated control mechanism connected with said water supply, and a freezing drip thermostat also connected with said water supply for governing the pressure in said control mechanism.

In testimony whereof, we have hereunto subscribed our names in the presence of two subscribing witnesses.

WILLIAM WISHART.
ALBERT H. MORRELL.

Witnesses:
FRED E. PAESLER,
JAMES M. O'BRIEN.